No. 705,008. Patented July 15, 1902.
A. ZWICKER.
COMBINATION RAKE AND FORK.
(Application filed Jan. 31, 1902.)
(No Model.)
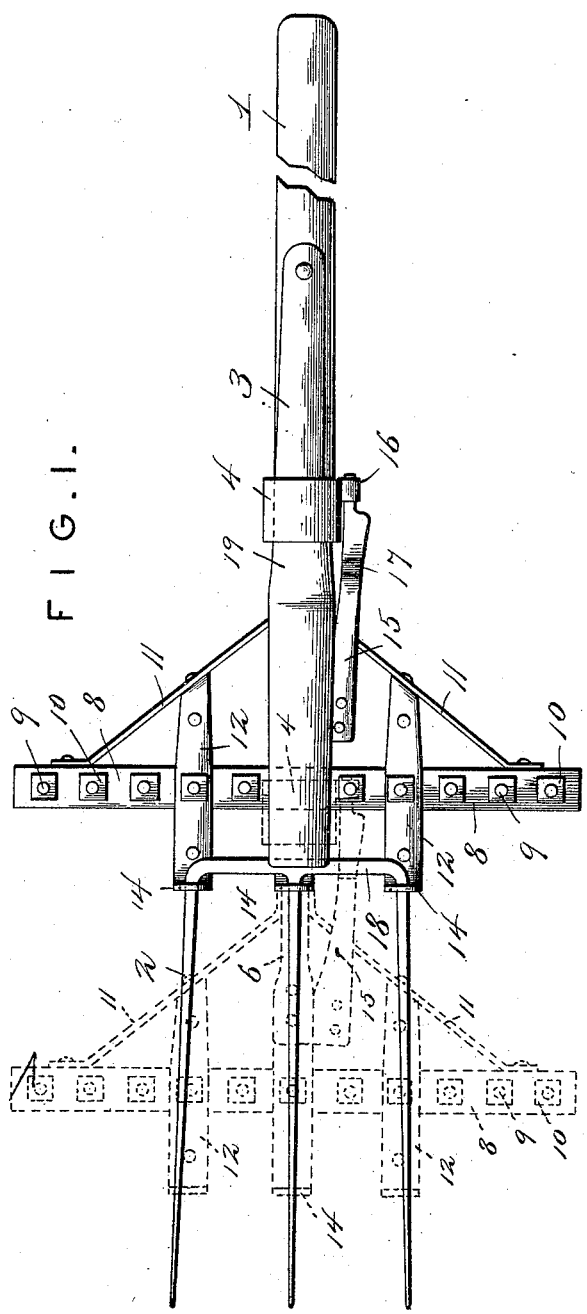
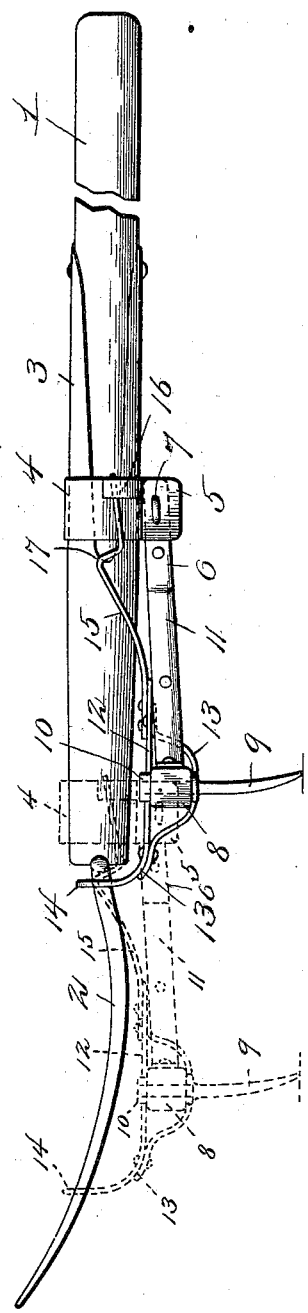
WITNESSES:
INVENTOR
August Zwicker.
BY Victor J. Evans
Attorney

UNITED STATES PATENT OFFICE.

AUGUST ZWICKER, OF RUSK, TEXAS.

COMBINATION RAKE AND FORK.

SPECIFICATION forming part of Letters Patent No. 705,008, dated July 15, 1902.

Application filed January 31, 1902. Serial No. 92,048. (No model.)

*To all whom it may concern:*

Be it known that I, AUGUST ZWICKER, a citizen of the United States, residing at Rusk, in the county of Cherokee and State of Texas, have invented new and useful Improvements in a Combination Rake and Fork, of which the following is a specification.

This invention relates to a combined fork and rake which is capable by a simple adjustment of use either as a rake or a fork.

The object of the invention is to provide a simple combination farm implement of such construction that it may be readily adjusted to permit the essential components thereof to be used individually without interference of one with the other and to combine in one implement at a comparatively reduced expense of manufacture two devices which are frequently used in farming and other work.

In the drawings, Figure 1 is a top plan view of the improved implement, showing the rake attachment projected in dotted lines. Fig. 2 is a side elevation of the same, also showing the rake implement in dotted lines.

Similar numerals of reference are employed to indicate corresponding parts in the views.

The numeral 1 designates a handle, preferably constructed of wood and of suitable length, and rigidly attached to the forward extremity thereof is a fork 2, which in the present instance has three tines.

The device as thus far described is to all intents and purposes similar to the ordinary fork construction and has the forward extremity of the handle sheathed or covered by a metallic elongated wear-thimble 3. On the forward extremity of the handle 1 and bearing upon the thimble 3 is a slidable sleeve 4, having a lower socket 5, in which the rear end of a rake-bar 6 is detachably secured by a removable pin 7, the front end of said bar being rigidly connected to a rake-head 8, from which depend a plurality of rake-teeth 9 of that class which is removably held by nuts 10 and capable of replacement in the event of breakage. Between the bar 6 and the cross-head strap-braces 11 are disposed and secured, and forwardly projecting from and secured to the rake-head 8, the said braces 11, and the front extremity of the bar 6 are a series of guide-clips 12, braced by straps 13, passing under the rake-head and secured thereto in part and also to the said rake-head and the rake-bar. The forward extremities 13 of the guide-clips 12 are upturned and provided with openings 14, as indicated by dotted lines in Fig. 1, and through the said openings 14 the tines of the fork 2 are inserted, the openings 14 being large enough to compensate for the divergence of the outer tines when the rake attachment is moved forwardly into operative position, as shown by dotted lines.

It is obvious that some means must be provided for locking the rake attachment in its projected or operative position, and for this purpose a spring-catch 15 is secured at its front extremity to the rake and has its rear terminal loosely mounted in a loop 16 on the sleeve 4, said spring at an intermediate point adjacent to the sleeve being formed with a drop or shoulder 17 to snap over the cross-head 18 of the fork 2, as shown by dotted lines in Fig. 2. The portion of the spring-catch between the shoulder 17 and the retaining-loop 16 is adapted to be engaged by the finger of the operator in releasing said shoulder from the cross-head 18 of the fork when it is desired to retract the rake attachment, the said loop 16 serving to retain the spring in positive relation to the sleeve 4, so that it will effectually serve as a lock and be prevented from moving laterally and becoming accidentally disengaged.

The handle 1 and thimble 3 at a suitable distance rearwardly from the front extremity of said parts are diametrically reduced gradually, as at 19, so that when the sleeve 4 is drawn backwardly to retract the rake attachment the latter will be prevented from slipping forwardly when it is desired to have the device arranged for use as a fork and as clearly shown in full lines in both figures. When the use of the rake attachment is desired, the sleeve 4 is pushed outwardly to the dotted-line position or until the shoulder 17 of the catch-spring 15 engages the cross-head 18 of the fork, the said catch-spring maintaining the rake attachment in its projected position with sufficient resistance to avoid accidental disengagement or retraction of the said rake attachment, and thereby permit the latter to be used in a practical manner as a rake.

The improved combination device will be found exceptionally useful and is comparatively inexpensive as well as strong and durable, and changes in the form, proportions, dimensions, and minor details may be resorted to without departing from the principle of the invention.

Having thus fully described the invention, what is claimed as new is—

1. An implement of the class set forth having a handle with a fork, and a rake attachment having a sliding connection with both the handle and the tines of the fork.

2. An implement of the class set forth comprising a fork having a handle, a rake attachment having slidable connections with both the handle and the tines of the fork, and a locking device carried by the rake attachment to engage a portion of the fork to hold said attachment in operative projected position.

3. An implement of the class set forth comprising a fork having a handle, and a rake attachment having forwardly-projecting guide-clips engaging the tines of the fork, and a sleeve movable on the handle.

4. An implement of the class set forth, comprising a fork having a handle with a diametric reduction in rear of its forward extremity, a rake attachment provided with guide devices engaging the tines of the fork, and a sleeve movable on the handle, and a locking device carried by the attachment for engagement with a portion of the fork to maintain the said attachment in projected operative position.

5. An implement of the class set forth comprising a fork with a handle and a rake attachment having a series of forwardly-projecting guide-clips with upturned ends engaging the tines of the fork, and a sleeve slidably mounted on the handle.

In testimony whereof I affix my signature in presence of two witnesses.

AUGUST ZWICKER.

Witnesses:
 JOE NICKERSON,
 W. P. ARDREY.